2,846,443
Patented Aug. 5, 1958

2,846,443
PROCESS APT TO IMPROVE THE RECOVERY OF SELECTIVE SOLVENTS, AND PARTICULARLY OF SOLVENTS DESTINED TO THE SEPARATION OF ACETYLENE FROM GASES CONTAINING SAME

Giorgio Malusa and Mario Rossoni, Porto Marghera, Italy, assignors to Società Edison S. p. A., Milan, Italy No Drawing. Application May 31, 1956
Serial No. 588,217

Claims priority, application Italy October 14, 1955

3 Claims. (Cl. 260—326.5)

The synthetic production of acetylene by cracking gaseous hydrocarbons by means of a partial combustion with oxygen, results in the forming of a gaseous mixture composed mostly of carbon oxide (CO), hydrogen and a small quantity of acetylene and its homologues (higher acetylene).

The separation of the pure acetylene from this mixture is normally obtained by means of absorption by washing with special selective solvents, miscible in water such as for instance: di-methyl-formo-amide, gamma-butyrolactone, N-methyl-pyrrolidone.

The considerable cost of these solvents makes it necessary to recover the same as completely as possible. In commercial practice, such a recovery has heretofore been rather unsatisfactory because some of the acetylene homologues are contained in the gaseous mixture resulting from the cracking.

These homologues polymerize forming colloidal suspensions, which, during the recovery of the solvents, have to be eliminated by flocculation which latter is brought about by means of a strong dilution with water. The flocculation heretofore has been a delicate operation, difficult to control and always incomplete; it was difficult and expensive successively to filter and wash the filtrate cake while a considerable loss in the selective solvent in the cake was suffered. In addition thereto, the cost of reconcentrating the diluted solvent thus recovered was relatively high.

In accordance with the present invention the recovery of the solvents is facilitated in that there occurs a more abundant flocculation of the aforesaid acetylene homologues, which, moreover separate in the form of coarser curds whereby filtration is more thoroughly and easily accomplished; and whereby less wash water is required to extract the remaining solvents from the filter cake.

The invention consists in that prior to the flocculation, small quantities of organic compounds only slightly soluble in water are added to the selective solvents which organic compounds assist the flocculation of the colloidal suspensions of the polymers derived from the acetylene.

Such compounds assisting the flocculation are, for instance, aromatic hydrocarbons such as toluene, benzene and homologues of benzene and chlorinated hydrocarbons such as tri-chloro-ethylene.

When using gamma-butyrolactone as solvent for the selective absorption of the acetylene contained in the gaseous mixture from the cracking of gaseous hydrocarbons, there are normally consumed, in the operation of separating the colloidal polymers formed in the solvent, about 10 kilograms of selective solvent per ton of pure acetylene produced. According to the present process, with the addition of benzene prior to the separation of said polymers, the quantity of selective solvent consumed is less than 0.2 kilogram per ton of acetylene produced.

In the example set forth below, the proportions referred to are percentages by weight.

*Example*

To 100 parts of solvent gamma-butyrolactone, which has been used for the absorption of the acetylene, and contains 10% of acetylene polymers, there are added, in the cold, 5 parts of benzene. The mixture is diluted with water, and by means of filtration there are separated the coagulated polymers. In the filtered mixture, consisting of an aqueous solution of gamma-butyrolactone, there are recovered 89.5% parts of the original 100 parts of solvent introduced (excluding the 10 parts of polymers which remain on the filter).

It is obvious that any similar process, adapted to bring about the flocculation of suspended colloids in similar selective solvents destined for the separation of gaseous mixtures, may be derived from the process described above. Therefore, the above example does not constitute a limitation of the present invention except as defined by the claims.

What we claim is:

1. A process for improving the recovery of selective solvents, employed in the separation of acetylene from gases containing same, which includes the step of: prior to flocculation adding to said solvents small quantities of organic compounds only slightly soluble in water and selected from the group consisting of aromatic hydrocarbons and chlorinated hydrocarbons to thereby aid in the flocculation of the colloidal suspension of the polymers derived from the acetylene and contained in said solvents.

2. A method of improving the recovery of selective solvents, employed in the separation of acetylene from gases containing same, which includes the step of: prior to flocculation adding to said solvents small quantities of organic compounds selected from the group consisting of toluene, benzene, homologues of benzene and trichloroethylene.

3. A method of improving the recovery of selective solvents employed in the separation of acetylene from gases containing same, said solvents being selected from the group consisting of gamma-butyrolactone, N-methyl-pyrrolidone and di-methyl-formoamide, which includes the step of: prior to flocculation, adding to the solution containing said solvents small quantities of organic compounds selected from the group consisting of toluene, benzene, homologues of benzene and trichloroethylene.

References Cited in the file of this patent

UNITED STATES PATENTS

| | | |
|---|---|---|
| 2,738,860 | Lorenz et al. | Mar. 20, 1956 |
| 2,741,332 | Fenneran et al. | Apr. 10, 1956 |